US008656848B2

(12) United States Patent
Hubalek et al.

(10) Patent No.: US 8,656,848 B2
(45) Date of Patent: *Feb. 25, 2014

(54) SEED DISTRIBUTION TOWER FOR AN AIR SEEDER

(75) Inventors: Verne A. Hubalek, Lindsborg, KS (US); Jacob R. Riffel, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/157,890

(22) Filed: Jun. 10, 2011

(65) Prior Publication Data

US 2012/0312211 A1 Dec. 13, 2012

(51) Int. Cl.
*A01C 7/04* (2006.01)
*A01C 7/16* (2006.01)
*A01C 17/00* (2006.01)
*A01C 19/00* (2006.01)

(52) U.S. Cl.
USPC ........... 111/175; 111/200; 111/903; 340/674; 340/684

(58) Field of Classification Search
USPC ......... 111/922, 921, 903, 900, 200, 186–188, 111/175, 174, 170, 118–129; 701/50; 340/684, 674; 310/345
See application file for complete search history.

(56) References Cited

U.S. PATENT DOCUMENTS

| 4,109,824 A | * | 8/1978 | Davis ............................... 221/7 |
| 5,074,228 A | | 12/1991 | Daws |
| 5,831,542 A | | 11/1998 | Thomas et al. |
| 6,273,648 B1 | | 8/2001 | Poncelet et al. |
| 7,555,990 B2 | | 7/2009 | Beaujot |
| 2011/0035163 A1 | | 2/2011 | Landphair |

OTHER PUBLICATIONS

Intenational Search Report and Written Opinion for PCT Patent Application No. PCT/US2012/041357, filed Jun. 7, 2012; Mailed: Dec. 26, 2012; 13 pages.

* cited by examiner

*Primary Examiner* — Christopher J Novosad
(74) *Attorney, Agent, or Firm* — Hovey Williams LLP

(57) ABSTRACT

The seed distribution tower of an air seeder splits a single, primary stream of conveying air and seeds into a plurality of secondary streams for delivery to openers that deposit the seeds into the ground as the seeder advances. As seeds enter the head of the tower in an upward vertical direction through an inlet at the bottom of the head, they are scattered 360° in a horizontal direction by an inverted, overhead distribution cone. The inlet through which the seeds enter the distribution head has an eased configuration to reduce turbulence and promote laminar flow within the head during the dramatic transition from vertical to horizontal movement. Sensitive components such as tram line valves, solenoid actuators, and blockage sensors are protectively housed within the interior of the distribution head to avoid exposure to hostile environmental elements.

23 Claims, 17 Drawing Sheets

SEED DISTRIBUTION TOWER FOR AN AIR SEEDER

TECHNICAL FIELD

Figure 1:
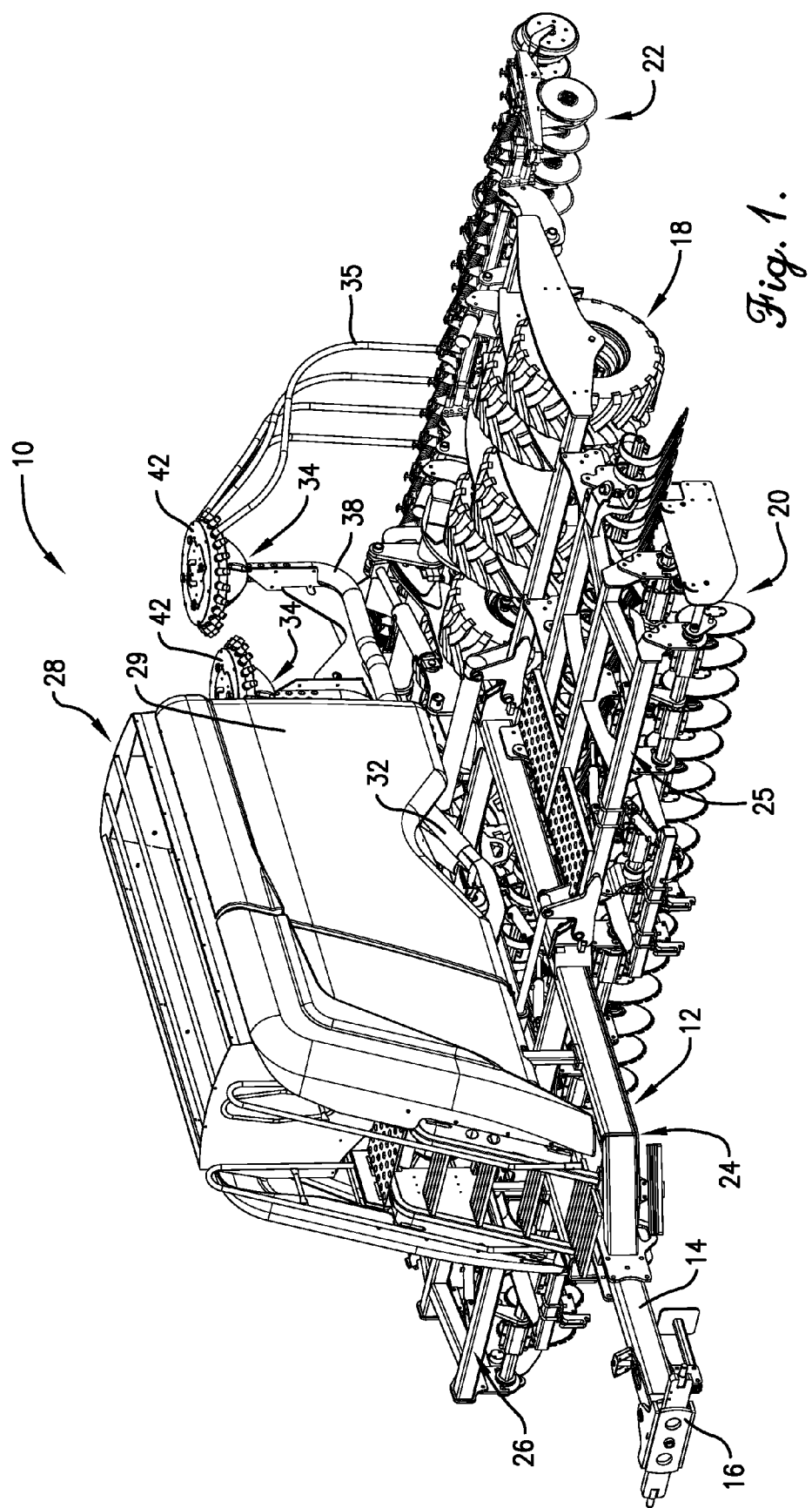
Figure 2:
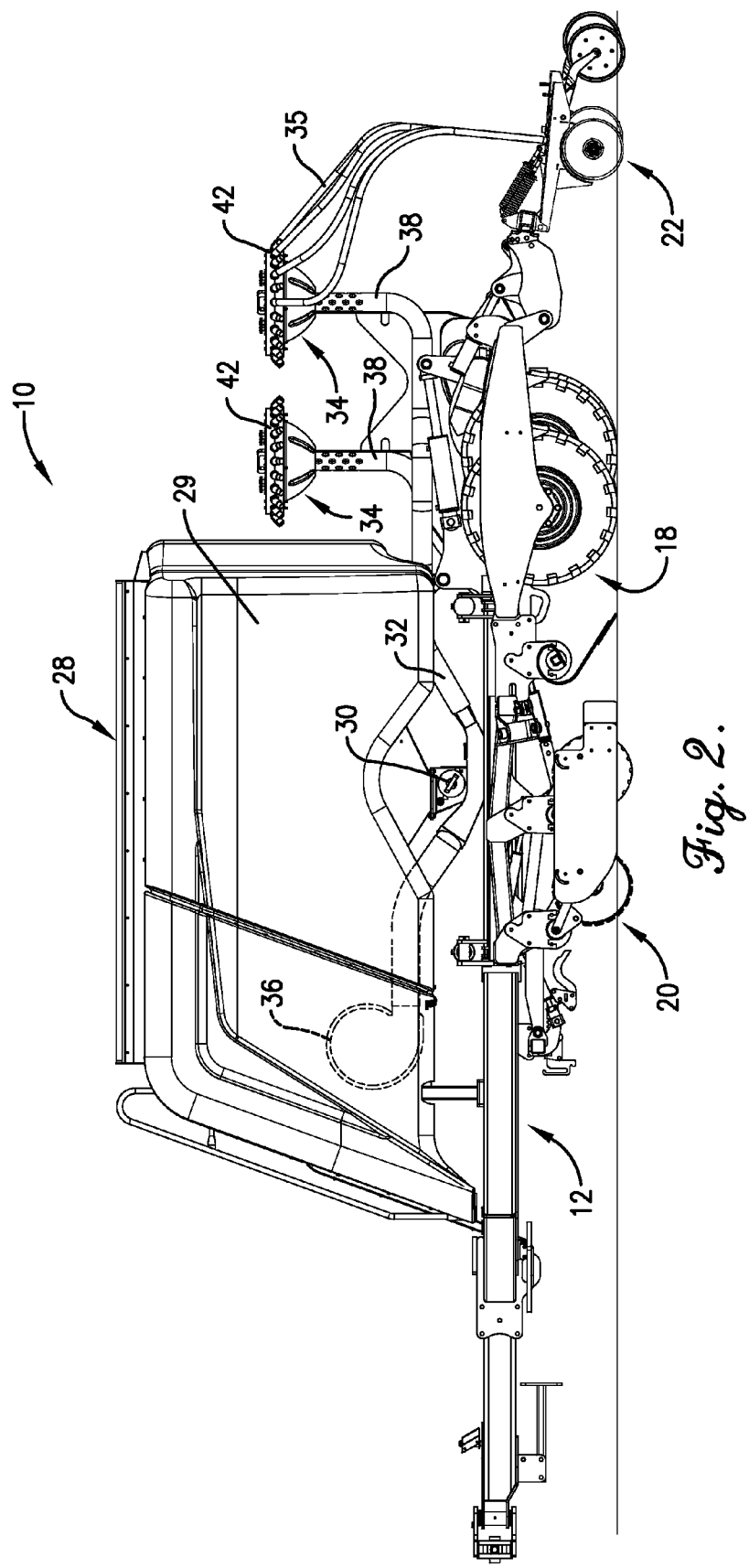
Figure 3:
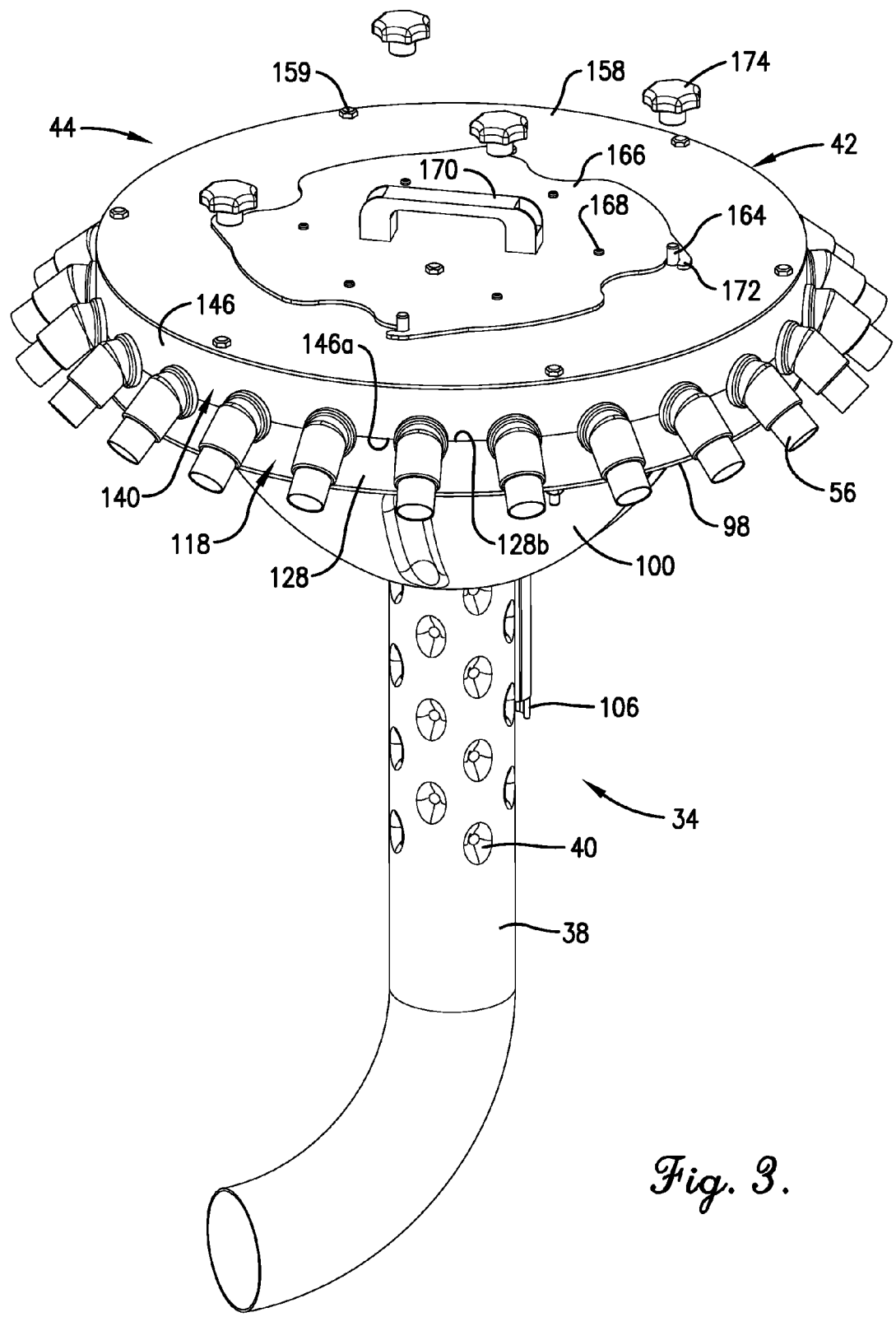

The present invention relates to air seeders and, more particularly, to improvements in the way in which a primary stream of air and seeds from a bulk source of supply on the machine is divided into a multiplicity of secondary streams for conveyance to individual openers that deposit the seeds into the ground as the machine advances.

BACKGROUND AND SUMMARY

It is well known in the farm equipment industry to meter seeds or other particulate materials from bulk supply hoppers on the seeder into one or more airstreams that transport the seeds to a corresponding number of distribution towers, where each primary stream of air and seeds is divided into a number of secondary streams. The secondary streams are then directed to openers on the machine that deposit the seeds into the ground as the seeder advances.

It is also well known to temporarily shut off one or more of the hoses that carry the secondary streams so that the corresponding opener does not deposit any seeds, thereby creating a plant-free row in the field sometimes known as a tram line. Valves and electrically energized valve actuators of various types have been employed to carry out this function. In addition, electronic sensors have typically been provided on the secondary hoses to detect whether seeds are in fact passing through the hoses as anticipated. However, seeders necessarily operate in relatively harsh environments, and in the past the sensitive valves, actuators and sensors have been subject to malfunction and premature wear due to excessive exposure to such hostile conditions.

As the primary stream of air and seeds enters the distribution head of the tower through an inlet in the bottom of the head, the seeds are subjected to an abrupt right angle change in direction as they are split into secondary streams and exit the head horizontally. In prior towers, a significant amount of turbulence has been created at this location that can adversely affect the output rate of the tower and may damage the seeds.

Accordingly, the present invention provides a seed distribution tower wherein sensitive devices such as tram line valves, actuators and/or sensors are protectively housed within the interior of the distribution head of the tower, away from harsh environmental elements that could damage or ruin the devices. In another aspect of the present invention, the distribution head of a seed distribution tower is provided with an internal plenum configured to reduce turbulence and promote more laminar flow as the primary stream splits into secondary streams and transitions from vertical to horizontal movement, thereby increasing the flow rate through the tower and reducing seed damage. An eased inlet into the bottom of the plenum from the conduit eliminates the squared off corner of prior designs to assist the incoming air and seeds in making a smooth transition. In one embodiment, the eased inlet comprises an opening in the floor of the plenum and a raised rim around such opening, preferably arcuate in transverse cross-section, An inverted overhead cone projects down from the top wall of the plenum in concentric relationship with the inlet to cooperate in transitioning and splitting primary stream. Other embodiments include a beveled opening into the plenum having either substantially flat or rounded sloping sidewalls.

BRIEF DESCRIPTION OF THE DRAWINGS

FIG. 1 is a left, front perspective view of a cultivation air seeder utilizing seed distribution towers in accordance with the principles of the present invention;

FIG. 2 is a left side elevational view of the seeder;

FIG. 3 is an enlarged left front perspective view of one of the distribution towers of the seeder with the secondary distribution hoses removed for clarity;

FIG. 4 is an enlarged, fragmentary bottom perspective view of the tower with parts broken away to reveal details of construction;

FIG. 5 is a fragmentary exploded view of the tower;

FIG. 6 is a top plan view of the tower;

FIG. 7 is a fragmentary vertical cross-sectional view through the upper end of the tower taken substantially along line 7-7 of FIG. 6;

FIG. 8 is an enlarged, fragmentary vertical cross-sectional view through the tower taken substantially along line 8-8 of FIG. 6;

FIG. 9 is an enlarged front perspective cross-sectional view of one of the blockage sensors of the tower;

FIG. 10 is a top perspective view of the lower disc of the stacked assembly of parts comprising the distribution head of the tower;

FIG. 11 is an enlarged, fragmentary cross-sectional view through part of the lower disc illustrating details of construction;

FIG. 12 is a bottom perspective view of the lower disc;

FIG. 13 is a bottom perspective view of the top disc of the stacked assembly of parts comprising the distribution head of the tower;

FIG. 14 is a top perspective view of the top disc;

FIG. 15 is a top perspective view of the inspection plate of the distribution head;

FIG. 16 is a bottom perspective view of the inspection plate, illustrating the attached transition cone in cross-section;

FIG. 17 is a fragmentary, vertical cross-sectional view through an alternative embodiment of the tower illustrating another form of eased transition inlet into the distribution head; and FIG. 18 is a fragmentary, vertical cross-sectional view through another alternative embodiment of the tower illustrating a further form of eased transition inlet.

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

With initial reference to FIGS. 1 and 2, an exemplary air seeder that may incorporate a seed distribution tower in accordance with the present invention is broadly denoted by the numeral 10 and is provided with a mobile chassis or frame 12 having a tongue 14 and hitch structure 16 for connecting seeder 10 to a suitable towing tractor or other vehicle (not shown). A number of ground-engaging wheels 18 are disposed across the rear of frame 12 to support the frame for over-the-ground travel. In the exemplary disclosed embodiment, seeder 10 comprises a cultivation air seeder and is thus provided with a set of cultivation tools 20 on frame 12 ahead of wheels 18. It will be appreciated, however, that the principles of the present invention may be readily employed on many different types of air seeders and are not limited to use with a cultivation air seeder. A row of openers 22 of any suitable construction well known to those skilled in the art is supported across the rear of frame 12 behind wheels 18. In the illustrated embodiment, seeder 10 comprises a three-section machine, such that frame 12 has a main frame section 24 and pair of left and right wing frame sections 25, 26 respectively, although the number of frame sections is not of importance insofar as the principles of the present invention are concerned. When applied to various parts of the machine, the terms "left" and "right" are utilized as if the machine were being viewed from the rear, looking forwardly.

Seeder 10 further comprises a hopper 28 supported on main frame section 24 for holding a supply of seeds and/or fertilizer or other particulate materials to be distributed to openers 22. Although the illustrated embodiment of the invention will be described in connection with the holding and distribution of seeds by hopper 28, it will be appreciated that the principles of the present invention are not limited to seeds and may, in fact, be utilized in connection with many different kinds of particulate materials.

A meter 30 at the bottom of hopper 28 may be utilized to dispense seeds at a metered rate into one or more conduits 32 that transport the metered seeds within an airstream toward the rear of the machine. One or more distribution towers 34 in accordance with the present invention are coupled with conduits 32 downstream from meter 30 for the purpose of dividing each primary stream of seeds into a multiplicity of secondary streams that flow to the openers 22 through hoses 35 (only a limited number being shown in the interest of clarity). A blower 36 adjacent the lower front end of hopper 28 supplies the transporting air for conduits 32 and the secondary hoses 35.

Hopper 28 may be constructed in a variety of different shapes and sizes, and from a variety of different materials. In the illustrated embodiment, hopper 28 is constructed from sheet metal and is covered on three sides by an ornamental facing 29 of molded ABS plastic or the like, which is the subject of related application Ser. No. 13/157,856 titled "Cultivation Air Seeder With Visually Enhanced Seed Hopper", assigned to the assignee of the present invention.

Each of the towers 34 includes an upright pipe or conduit 38 fixed to frame 12 and connected at its lower end to the conduit 32 from hopper 28. Conduit 38 may be provided with a multitude of exterior dimples 40 that form corresponding interior projections disposed to be impinged by seeds in the moving primary stream to aid in scattering the seeds as they approach the upper end of conduit 38. A generally flat, circular distribution head 42 is secured to the upper end of conduit 38 for splitting the primary stream into the secondary streams and transitioning the direction of seed flow from generally vertical to generally horizontal.

Figures 7, 8:
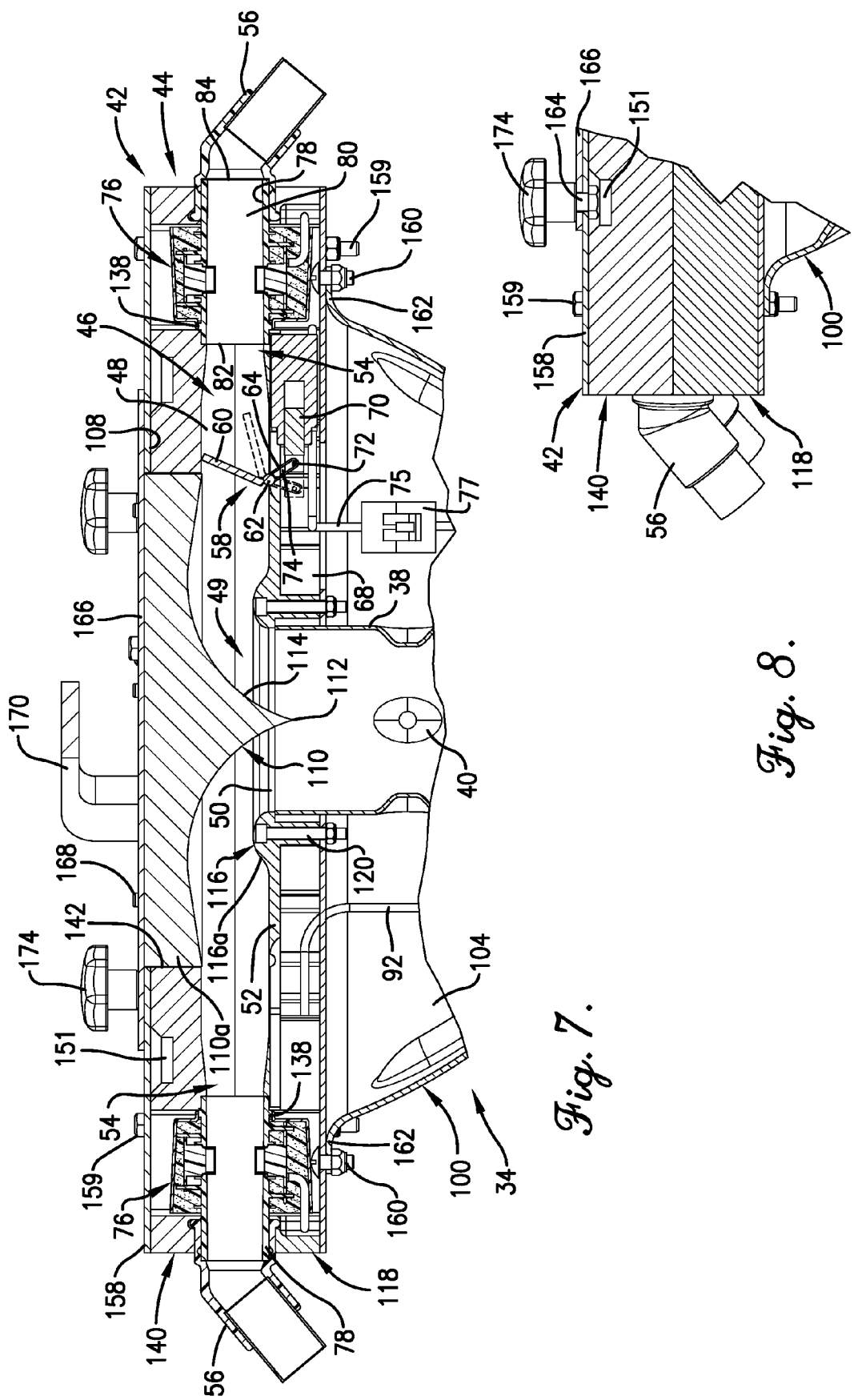

With reference to FIG. 7, in general terms distribution head 42 has an exterior 44 and a hollow interior 46. Interior 46 includes a plenum 48 that communicates with the upper end of conduit 38 via an eased inlet 49 that in one embodiment comprises (in part) a circular opening 50 in a floor 52 of plenum 48. Opening 50 surrounds the upper end of conduit 38 and is coaxially aligned therewith.

A series of outlets 54 within interior 46 extend circumferentially about the outer periphery of plenum 48 in communication therewith and are arranged on generally horizontal axes that project radially outwardly from the central axis of opening 50, in the nature of spokes of a wheel. A corresponding number of elbow fittings 56 are disposed around the exterior 44 of head 42 and are coupled with corresponding outlets 54. Fittings 56 are configured to attach to the corresponding secondary hoses that lead to the openers 22.

Figure 5:
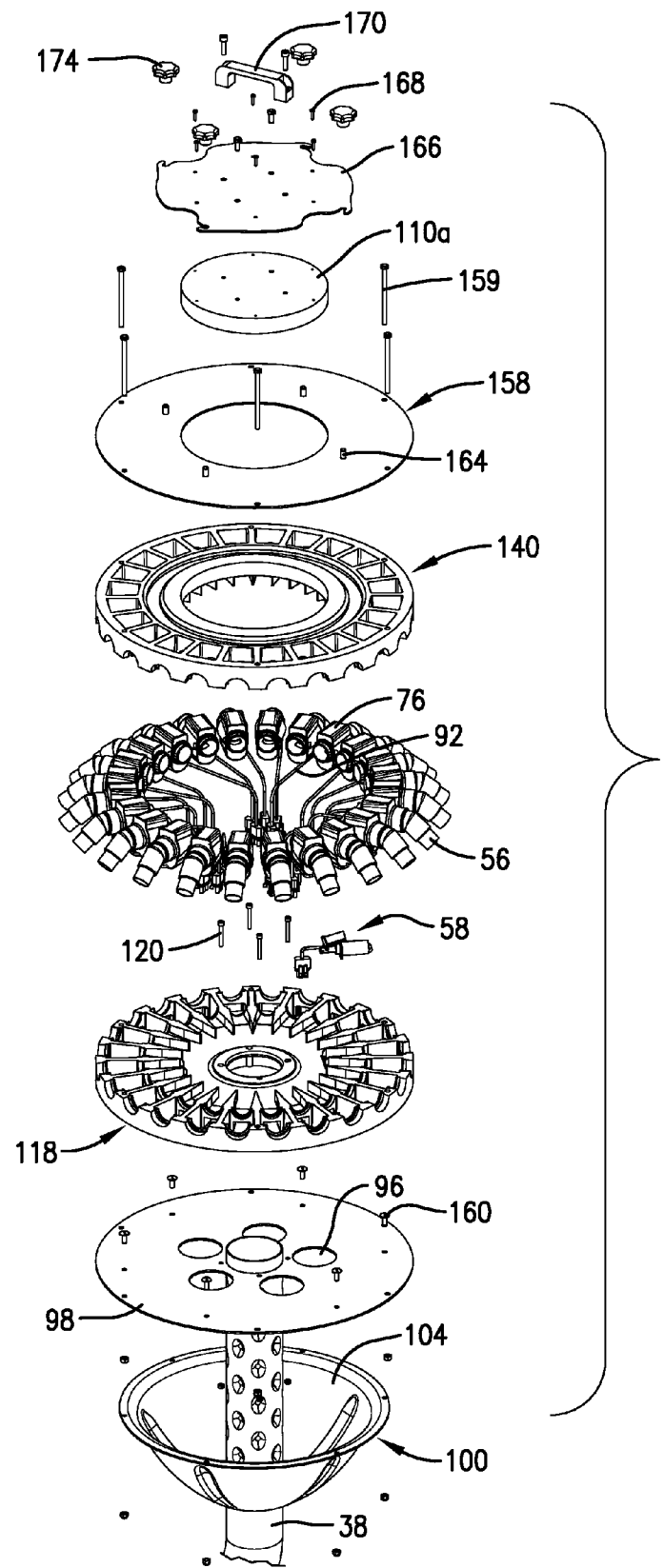
Figure 6:
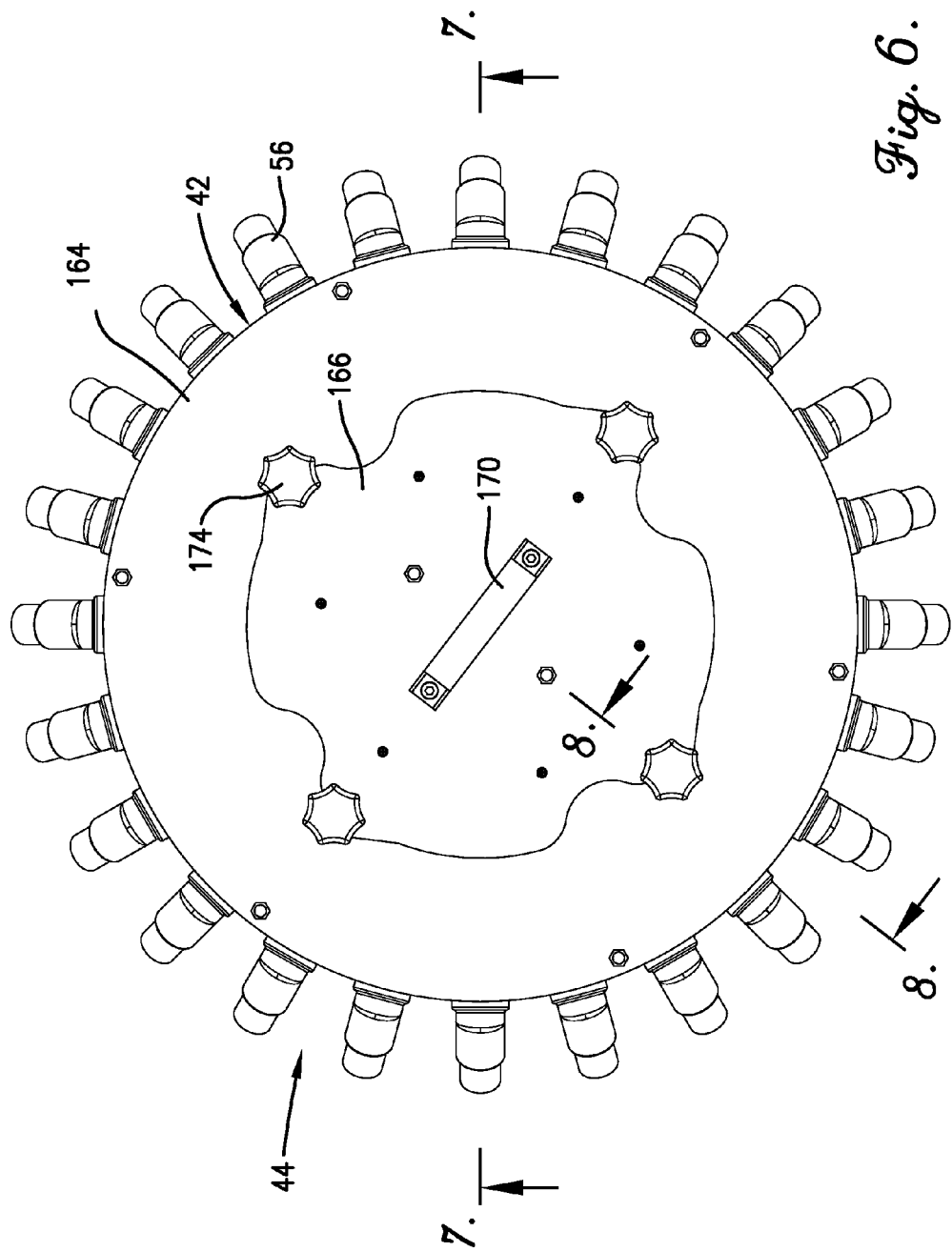

Distribution head 42 is adapted to facilitate tram line farming wherein one or more of the outlets 54 may be selectively closed off to prevent the delivery of seeds to the opener corresponding to the closed outlet. In the illustrated embodiment, distribution head 42 is adapted for selectively closing off a maximum of two diametrically opposed outlets 54, although there may be a smaller or greater number of such closable outlets without departing from the principles of the present invention. To carry out such closing function, a valve 58 (FIGS. 5, 7) is located within the interior 46 of head 42 at the radially inner end of each closable outlet 54 (only one such valve being illustrated), adjacent the outer periphery of plenum 48. Valve 58 is adapted to be actuated between a closed position blocking communication between plenum 48 and outlet 54, and an open position permitting such communication. Thus, when valve 58 is closed, seeds transitioning from conduit 38 to outlets 54 are not permitted to enter closed outlet 54 such that no seeds are delivered to the opener 22 for that particular closed outlet. Seeds that would otherwise enter the closed outlet 54 are thus deflected back into plenum 48 for random and even distribution to the unblocked outlets 54.

In the particular embodiment disclosed in the drawings, valve 58 is a flapper valve that opens and closes by pivoting about a transverse axis, although valve 58 could take a variety of different forms without departing from the principles of the present invention. Valve 58 has a generally rectangular flapper 60 that stands generally upright when in the closed position and lies down generally horizontally when in the open position. A transversely extending pivot rod 62 is fixed to flapper 60 across its lower end and is rotatably retained within the floor 52 of plenum 48 to define the axis of pivoting movement.

An operating arm 64 is fixed to rod 62 and projects downwardly therefrom through floor 52 where it is operably coupled with a solenoid actuator 66 housed within a chamber 68 beneath floor 52, but still within the interior 46 of distribution head 42. Solenoid 66 has a stem 70 that is retracted when flapper 60 is in the closed position and extended when flapper 60 is in the open position. In a preferred embodiment, stem 70 retracts when solenoid 66 is energized, thus closing the outlet, but stem 70 is not spring-loaded such that when solenoid 66 is in a deenergized condition the pressure of a secondary stream seeking to leave plenum 48 freely pivots flapper 60 to its open position, which pulls stem 70 out to an extended position. Arm 64 is connected to stem 70 by a transverse pin 72, and an elongated slot 74 in arm 64 receives pin 72 so as to accommodate the fact that arm 64 swings arcuately while stem moves linearly. Solenoid 66 has an electrical conductor 75 that connects solenoid 66 with a source of electrical potential, including a controller (not shown). A connector 77 may be provided at a distal end of conductor 75 to facilitate such connection.

Each of the outlets 54 includes a sensor 76 (FIGS. 5, 7, 9) for detecting the movement or non-movement of seeds through outlet 54. Each sensor 76 is disposed within the interior 46 of distribution head 72 in association with the outlet 54, rather than being located on the exterior 44 of the head. In the exemplary embodiment shown in the drawings, each sensor 76 is constructed to serve as part of the outlet 54 with which it is associated. In this respect, a main portion of each sensor 76 comprises a tube 78 having a central passage 80, an inboard end 82, and an outboard end 84. Inboard end 82 is closest to plenum 48, while outboard end 84 receives the fitting 56.

Figure 9:
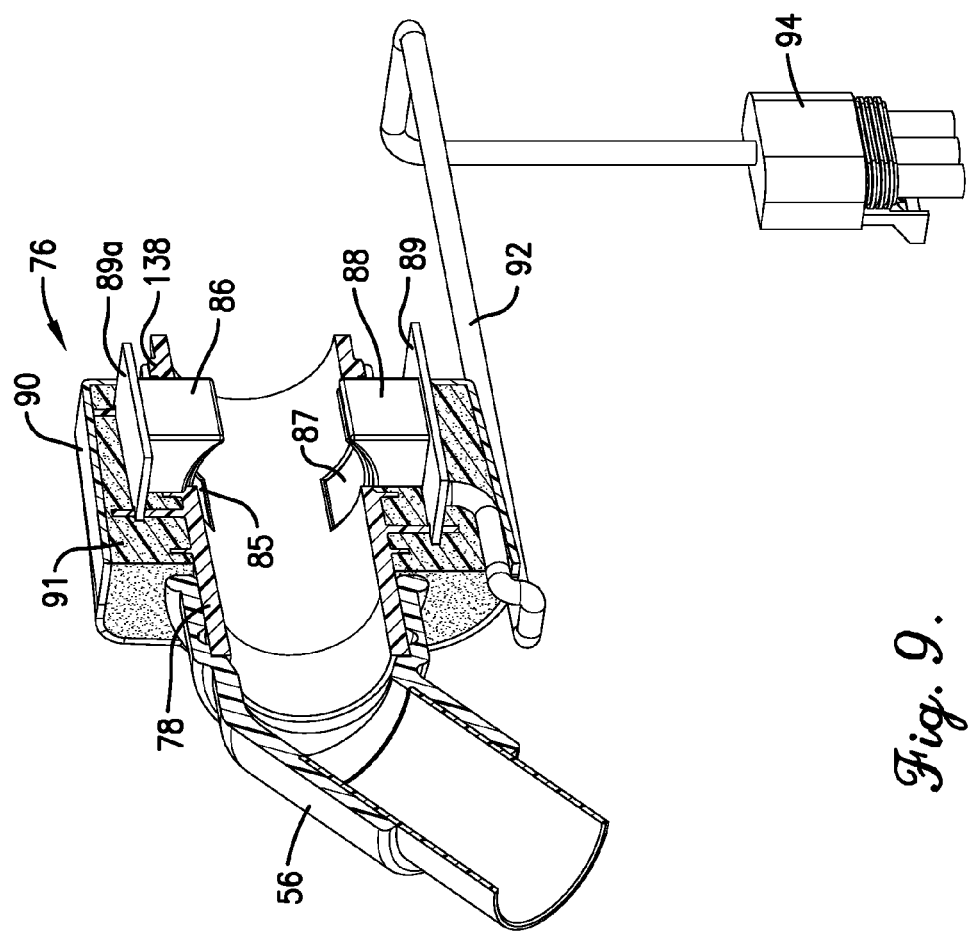

Details of the sensor 76 are illustrated in FIG. 9. In the illustrated embodiment, each sensor 76 comprises an optical sensor, although a variety of other types of sensors could be utilized, such as, for example, an audio sensor, a pressure sensor, or an impact sensor. Accordingly, the tube 78 of each sensor 76 carries a pair of photo cells 86, 88 arranged in diametrically opposed locations on tube 78 for transmitting a light beam across passage 80. One of the cells is a sender and the other is a receiver. Breaking of the light beam by moving seeds is utilized to confirm the fact that seeds are indeed being dispensed through the outlet. A clear lens 85 covers cell 86, while a clear lens 87 covers cell 88. A protective cup 90 surrounds tube 78 and the photo cells 86, 88 and contains a pair of circuit boards 89, 89a embedded within potting material 91, the boards 89, 89a being connected with cells 86, 88. Suitable boards 89, 89a are available from DICKEY-john Corporation of Auburn, Ill. as the VIGILENSE brand blockage sensor. An electrical conductor 92 is connected to boards 89, 89a and is located within chamber 68 below floor 52. Each conductor 92 has a connector 94 at its distal end for connecting sensors 76 with an appropriate control system of the machine.

Figure 4:
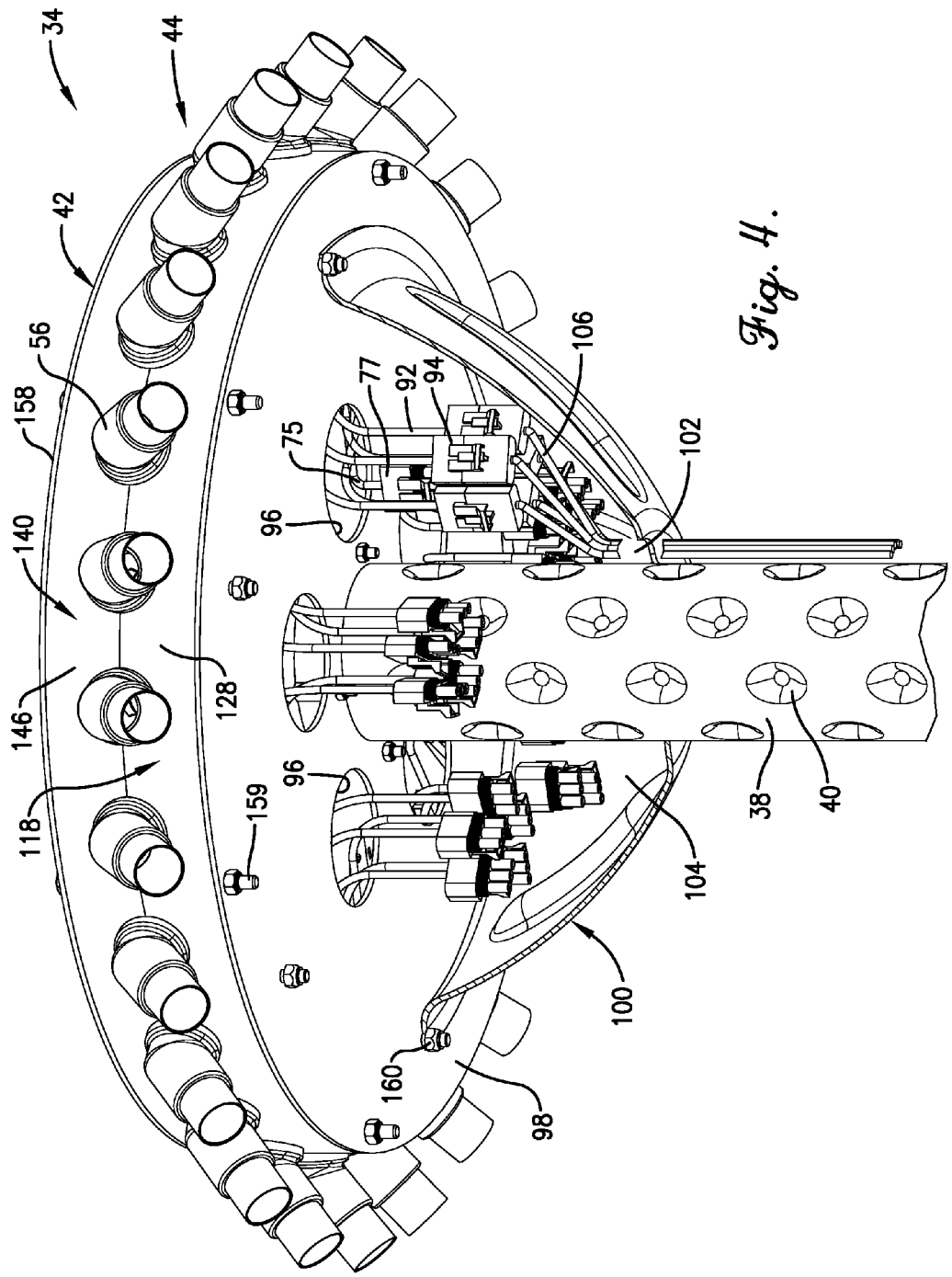

With reference to FIG. 4, the conductors 92 from sensors 76 and the conductor(s) 75 from solenoid(s) 66 lead generally radially inwardly from sensors 76 and solenoid(s) 66 toward conduit 38 and pass downwardly through a number of holes 96 in a circular, horizontal plate 98 that forms the bottom of distribution head 42. Plate 98 is welded or otherwise rigidly affixed to the upper end of conduit 38 and cooperates with the floor 52 of plenum 48 to define the chamber 68 within which the solenoids 66 are located. A bowl-shaped housing 100 is attached to the bottom of plate 98 and has an opening 102 that receives and clears the conduit 38. Housing 100 thus defines a protected compartment 104 immediately below the bottom of distribution head 42 within which electrical hardware such as portions of conductors 75, 92 and connectors 77, 94 may be disposed. Leads 106 forming part of the control system of the seeder may be routed upwardly through opening 102 and joined with the connectors 77, 94 within compartment 104.

Plenum 48 has a top wall 108 (FIG. 7) that is specially configured to cause the incoming primary stream of air and seeds to effectually transition from vertical to horizontal and split into the desired secondary streams. In this respect top wall 108 is provided with an inverted, centrally disposed transition cone 110 that is coaxial with conduit 38 and opening 50. Preferably, the cone 110 is so sized that its tip 112 projects downwardly into and slightly beyond opening 50, terminating within the upper end of conduit 38. Preferably also, the periphery 114 of cone 110 is parabolic in cross-section.

To provide additional guidance and smoothing for the air and seeds as they enter plenum 48 from conduit 38, the inlet 49 is constructed in the nature of an eased inlet so as to soften what would otherwise be a sharp, right angle corner or edge encountered by the air and seeds during their transition. In one embodiment, the eased inlet 49 comprises the planar opening 50 in floor 52 and a raised rim 116 around opening 50. Preferably, rim 116 is transversely rounded such that its upwardly facing surface 116a is arcuate. Rounded surface 116a is not necessarily concentric with the parabolic periphery 114 of cone 110 and is preferably a complex curve having a plurality of radii of curvature.

With reference to FIGS. 5-8 and 10-16, each distribution head 42 may advantageously be constructed from a stacked assembly of parts. Plate 98 may serve as the support for the stack inasmuch as plate 98 is rigidly affixed to conduit 38. A first or lower disc 118, preferably molded from a relatively hard, rubber-like material such as poured urethane, overlies plate 98 and is attached thereto by a plurality of bolts 120 (see also FIG. 7). Disc 118 has an annular, central collar 122 (FIGS. 11, 12) that projects downwardly from the underside of rim 116 and encircles the upper end of conduit 38. Collar 122 is coaxial with opening 50 and is slightly larger in internal diameter than opening 50 so as to define an undercut below rim 116 that rests upon the uppermost edge of conduit 38. A circular web portion 124 projects outwardly from collar 122 at the base of rim 116 so as to present floor 52 of plenum 48 on the upper face of web 124 and the top of chamber 68 on the bottom face of web 124. A series of circumferentially spaced apart, radially extending ribs 126 interconnect web 124 with an outermost, annular wall 128 that is spaced radially outwardly from the outer circumferential edge of web 124 so as to present a circumferential series of voids 130 between ribs 126. Outer wall 128 has a flat bottom edge 128a that lies flatly against plate 98. At two diametrically opposed locations, the bottom side of web 124 is provided with a recessed, radially extending seat 129 that matingly receives the body of a solenoid 66. A transversely extending slot 131 near the radially inner end of seat 129 serves the dual functions of a pivot seat for the rod 62 of flapper 60 and clearance for operating arm 64.

Figure 10:
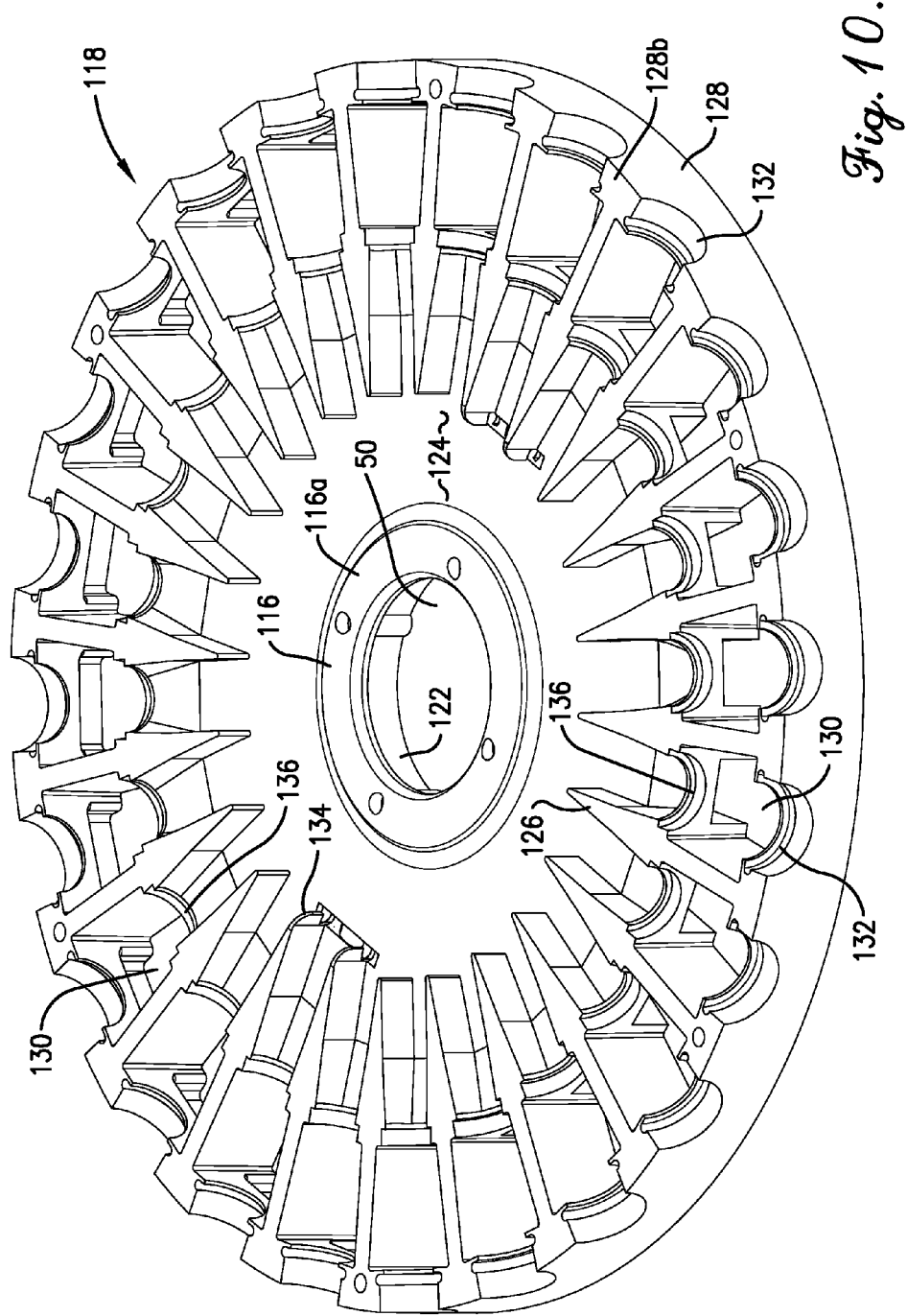
Figure 11:
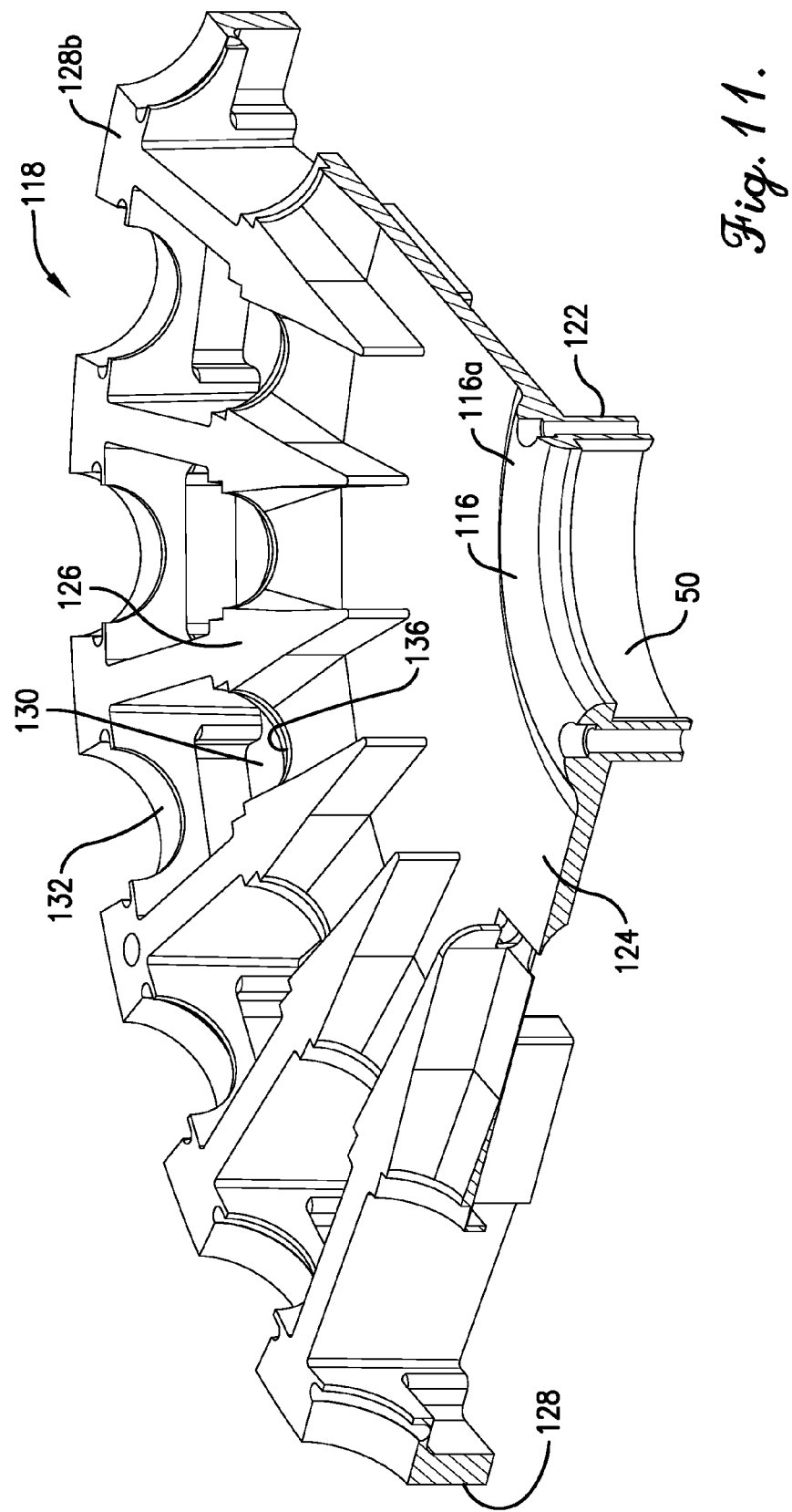
Figure 12:
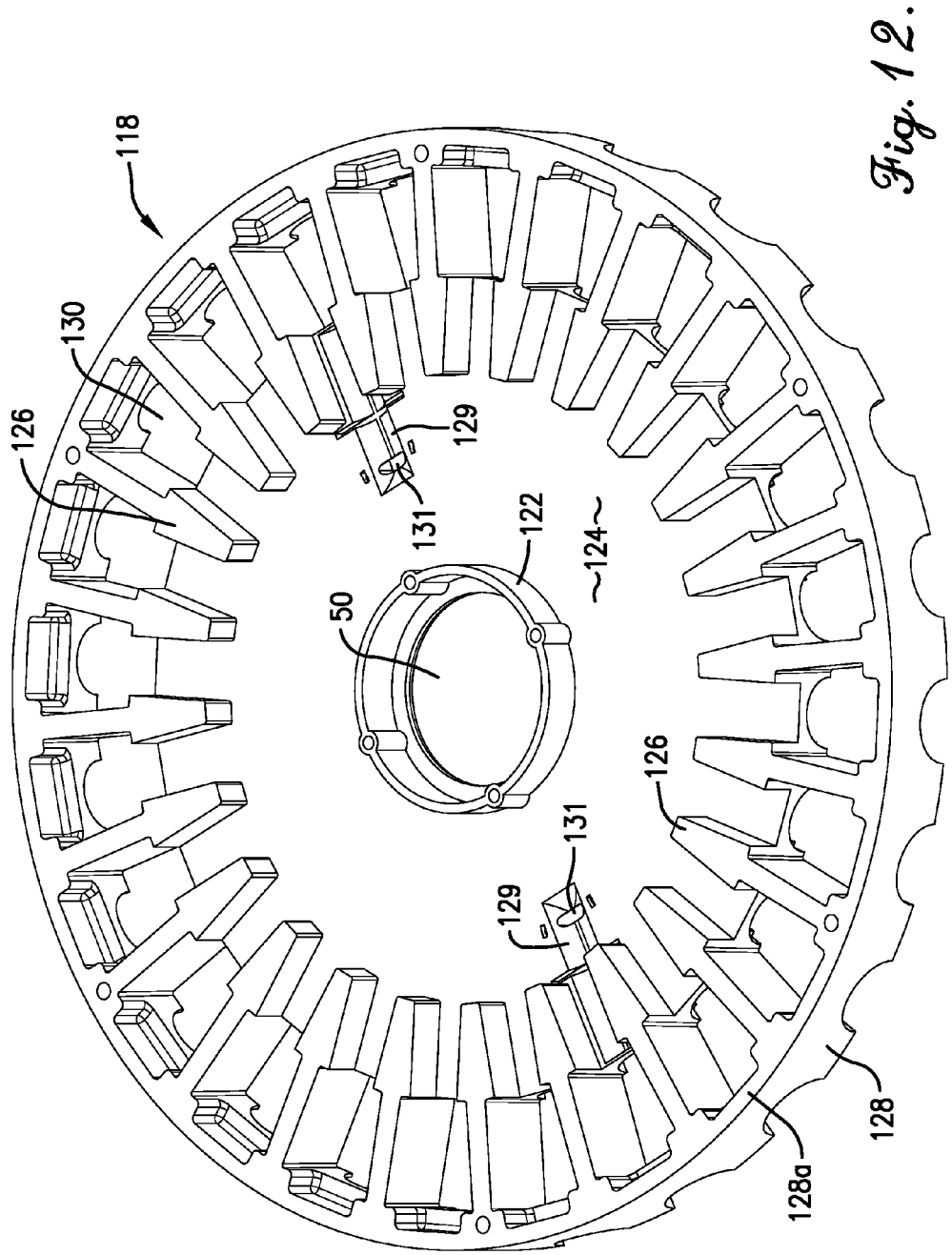
Figure 13:
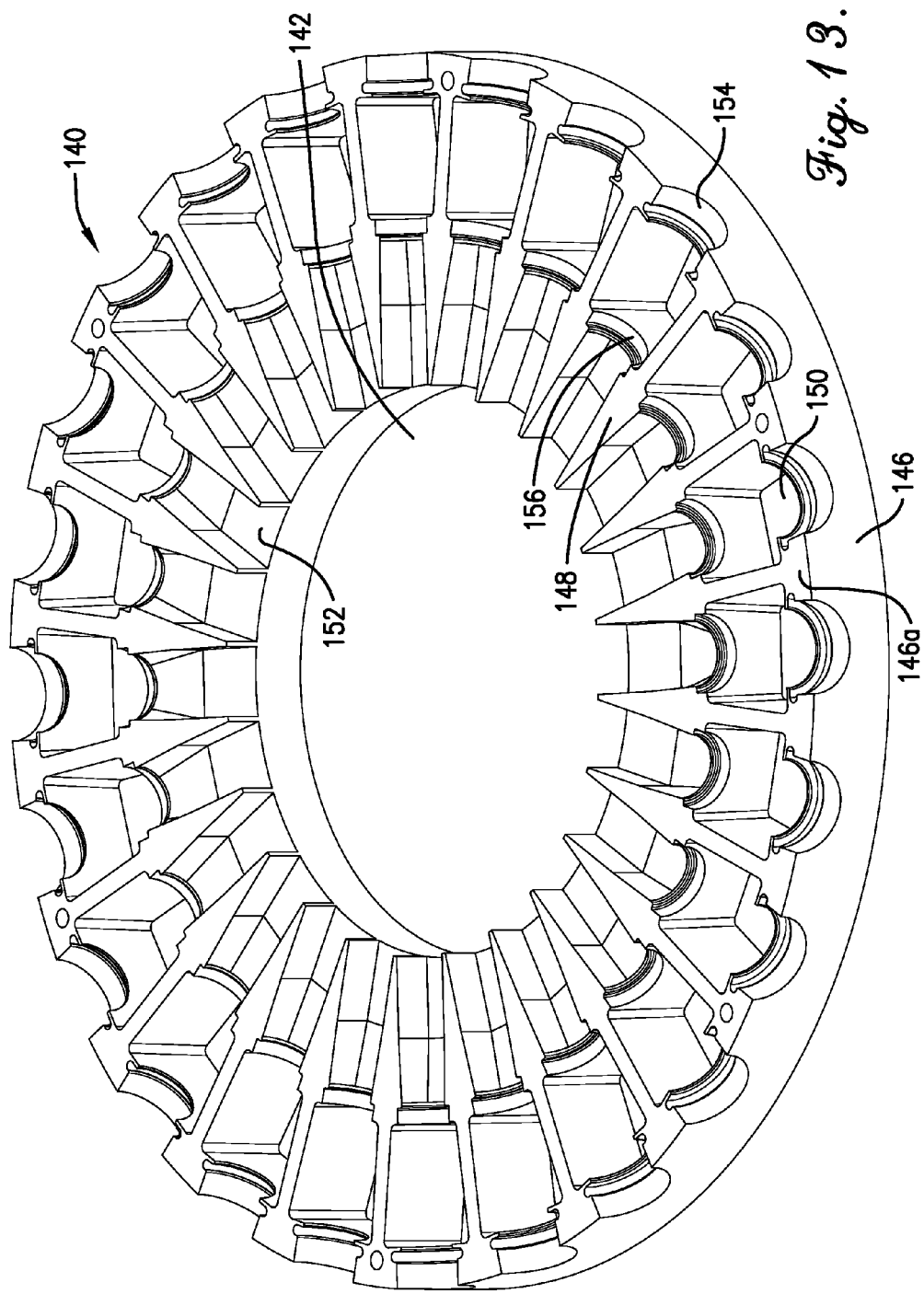
Figure 14:
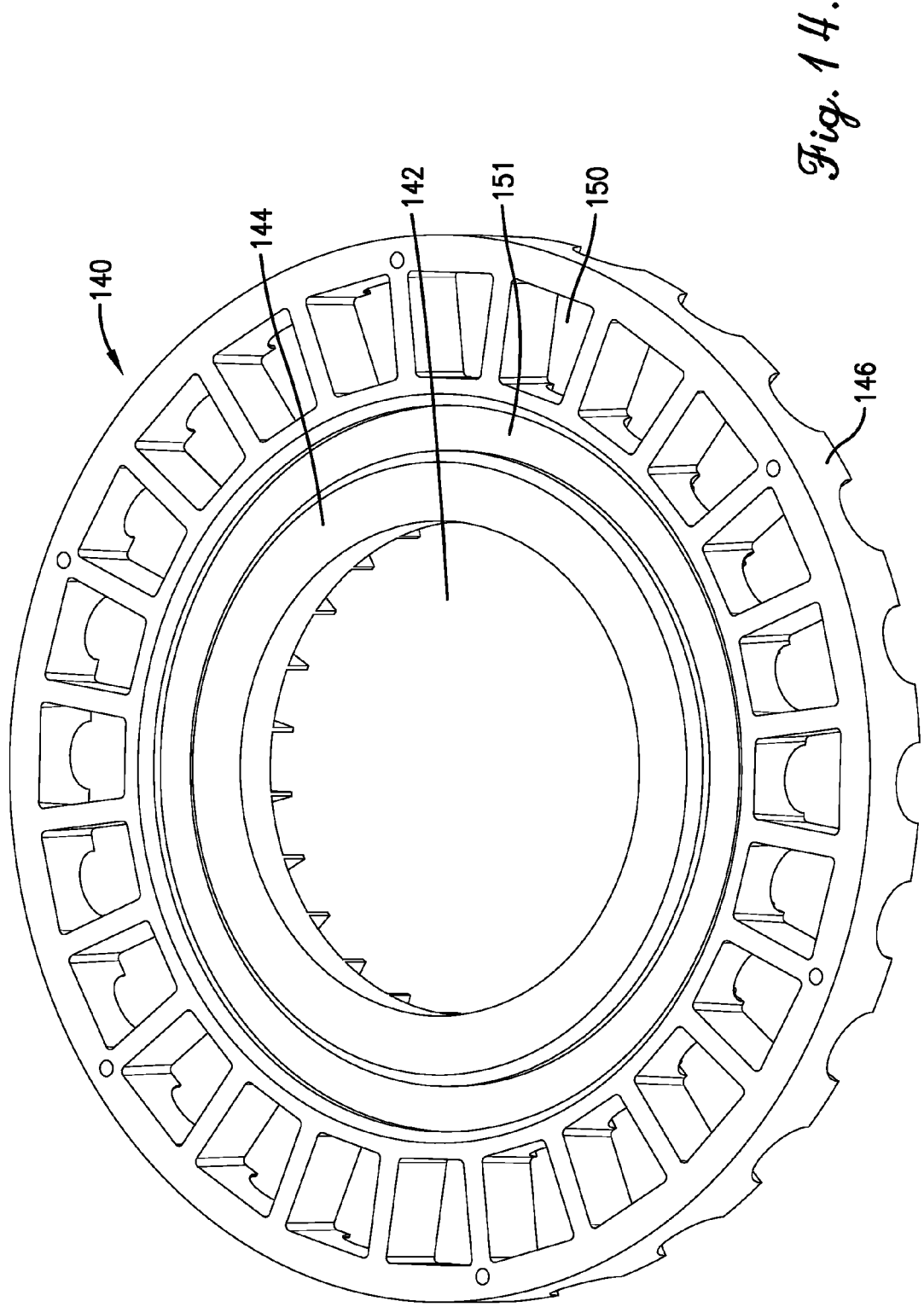
Figure 15:
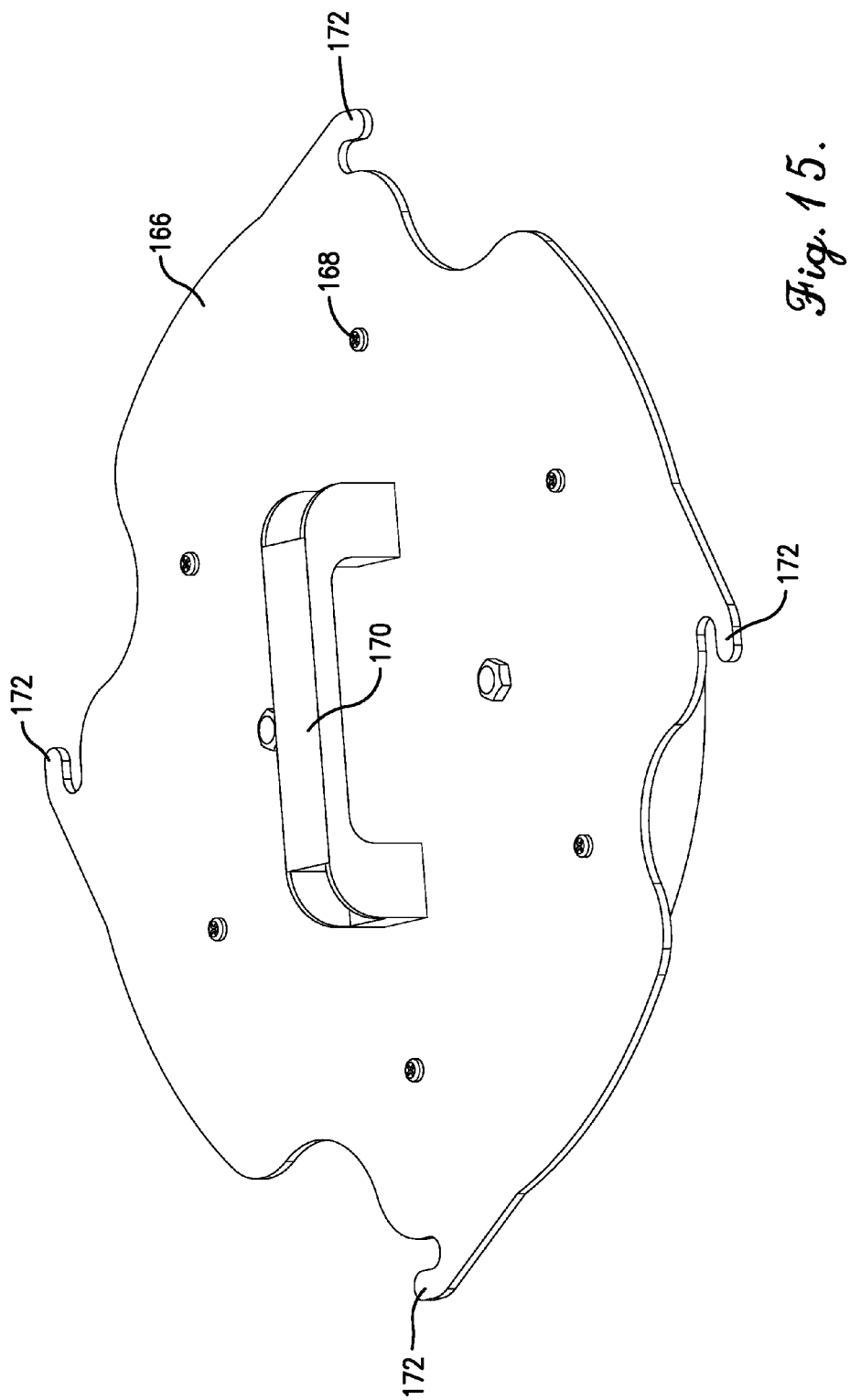
Figure 16:
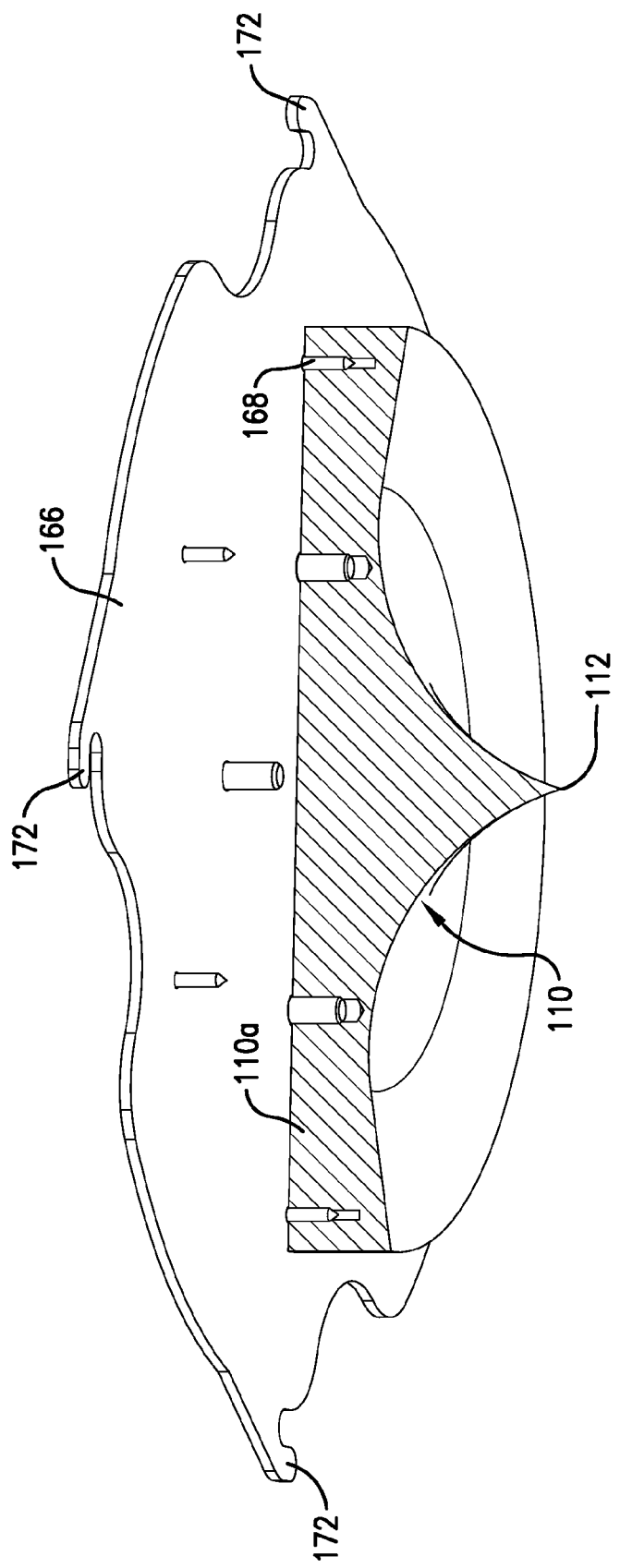

Referring particularly to FIGS. 10 and 11, the top edge 128b of outer wall 128 is scalloped to present a series of equally circumferentially spaced semi-circular notches 132 configured to complementally receive the semi-circular bottom parts of the inner end of fittings 56. The ribs 126 are thicker in a vertical dimension than web 124 so as to project upwardly beyond the plane of web 124 on the top side of disc 118 and downwardly below the plane of web 124 on the bottom side of disc 118. On the top side of disc 118 ribs 126 taper toward a radially innermost tip 134 that stops short of opening 50 and rim 116 to define the radially outer margin of plenum 46. Adjacent pairs of the tips 134 also define the entry end of outlets 54, and it will be noted that the flapper 60 is located at such entry end of its outlet 54. Spaced radially outwardly from tips 134 and at the radially inner extremity of the voids 130 are semi-circular, concave saddles 136 configured to matingly receive locating rings 138 (FIGS. 7, 9) on the exterior of sensor tubes 78.

A second or top disc 140 (FIGS. 13, 14) is stacked on top of lower disc 118 and is preferably molded from the same relatively hard rubber material (such as poured urethane) as lower disc 118. Top disc 140 has the same outer diameter as lower disc 118, but is provided with a significantly larger central opening 142 that is coaxial with opening 50. An annular web portion 144 surrounds opening 142 and is connected to an outermost annular wall 146 by a series of circumferentially spaced apart, radially extending ribs 148. Voids 150 are defined between adjacent ones of the ribs 148.

The top side of disc 140 is flat (FIG. 14), except for a shallow annular valley 151 between opening 142 and voids 150, but its bottom side (FIG. 13) is configured to cooperate with lower disc 118 in defining portions of the outlets 54 and means for locating and confining the sensors 76. To this end, on the bottom side of disc 140 web 144 is dished out to present a recessed annulus 152, and ribs 148 continue inwardly across annulus 152 to the edge of opening 142. Thus, ribs 144 on the bottom side of top disc 140 are configured substantially the same as ribs 126 on the top side of bottom disc 118 and are disposed in vertical registration therewith. Consequently, the stacked ribs 126 and 148 cooperate to define the side boundaries of outlets 54 for the width of web 144, while the annulus 152 defines the top boundary of the outlets 54 over that same radial width. When a valve 58 is in its closed position, flapper 60 thereof traverses substantially the entire vertical height of the outlet 54 between floor 52 and annulus 152.

Outer wall 146 is scalloped along its lower edge in the same manner as the upper edge of lower disc 118. Thus, a series of semi-circular notches 154 are defined in the lower edge 146a of wall 146 that register with corresponding notches 132 in lower disc 118. Notches 132 and 154 thus cooperate to matingly receive and retain the inner end of corresponding elbow fittings 56. The top portions of cups 90 of sensors 76 are received within the voids 150, while semi-circular saddles 156 at the radially inner ends of voids 150 register with corresponding saddles 136 on lower disc 118 to receive and confine the locating rings 138 on tubes 78 of sensors 76.

An annular top plate 158 (FIGS. 5, 7) having the same outer diameter as discs 118 and 140 overlies top disc 140. A plurality of long bolts 159 near the outer periphery of plate 158 pass downwardly through plate 158, top disc 140, bottom disc 118, and support plate 98 to clamp such parts together in a sandwich-like assembly. Housing 100 is attached to support plate 98 by a series of screws 160 (FIG. 7) that pass upwardly through an outmost circumferential flange 162 around housing 100. Cover plate 158 is provided with a number of upwardly projecting, externally threaded studs 164 (FIGS. 5, 8) for a purpose hereinafter explained in more detail. The heads of studs 164 project downwardly from the bottom side of cover plate 158 and are received within valley 151 to avoid interference with top disc 140.

Transition cone 110 is provided with a relatively thick, circular base 110a (FIGS. 5, 7, 16) that is slightly smaller in diameter than opening 142 in top disc140. The thickness of base 110a is substantially the same as the combined thickness of top disc 140 and cover plate 158. Cone 110 is affixed to an inspection plate 166 (FIGS. 5, 7, 15, 16) by a series of screws 168, and inspection plate 166 has a nominal diameter that is greater than opening 142. Accordingly, inspection plate 166 and cone 110 comprise an assembled unit wherein cone 110 fits within opening 142 and plate 166 overlaps the inner margin of top plate 158 to limit the depth of insertion of cone 110 into opening 142. Manifestly, this also establishes the working position of cone tip 112 with respect to rim 116, opening 50, and the upper end of conduit 38.

The unit that comprises cone 110 and inspection plate 166 may be conveniently installed and removed utilizing a handle 170 on the top of inspection plate 166. The peripheral edge of inspection plate 166 is configured to present four hooks 172 that open in a clockwise-facing direction and are sized to receive the studs 164 on top plate 158 when cone 110 is inserted into opening 142, inspection plate 166 is brought into abutting engagement with top plate 158, and inspection plate 166 is then rotated a short distance in a clockwise direction utilizing handle 170. A set of four internally threaded knobs 174 receive the externally threaded studs 164 for the purpose of releasably retaining inspection plate 166 on the studs 164. When knobs 174 are threaded downwardly on studs 164 to tightly bear against inspection plate 166, inspection plate 166 and cone 110 are held securely in place. Conversely, when knobs 174 are slightly backed off from a tight condition, inspection plate 166 and cone 110 may be slightly rotated in a counterclockwise direction to disengage hooks 172 from studs 164 and then lifted up and away from top plate 158 to provide inspection and access to the interior 46 of distribution head 42 via opening 142.

It should be apparent from the foregoing description that a distribution tower constructed in accordance with the principles of towers 34 provides a number of distinct advantages. Instead of being exposed to hostile environmental elements, critical and sensitive components associated with tower 34 are protectively contained within the interior 46 of distribution head 42. For example, tram line valves 58 are disposed within plenum 48, rather than on the exterior 44 of head 42 or elsewhere. Similarly, the solenoid actuators 66 for valves 58 are contained within the chamber 68 between support plate 98 and floor 52 of plenum 48.

In addition, sensors 76 are associated with outlets 54 inboard of elbow fittings 56 and are covered at the top and bottom by top plate 164 and support plate 98. Much of the conductors associated with sensors 76 and solenoids 66 are disposed within chamber 68, while that which extends below distribution head 42 is protectively received within compartment 104 of housing 100. The connectors between the conductors and leads are likewise well protected within compartment 104. While it is thus desirable that most of such sensitive components and hardware be contained within the interior 46 of distribution head 42, it is within the scope of the present invention to have less than all of such components so located.

It will be noted that as the primary stream of air and seeds passes upwardly through conduit 38 and the eased inlet 49 into the plenum 48, such stream encounters the downwardly projecting distribution cone 110. The parabolic periphery 114 of cone 110 gently splits the primary stream and disperses the seeds and air 360° into secondary streams that enter the outlets 54 on their way to the openers 22. In the first embodiment, raised rim 116 around opening 50 gently guides the seeds and air into plenum 48 while avoiding the presence of sharp corners that could otherwise cause turbulence and disruption of the flow. Consequently, it has been found that the flow rate through distribution head 42 is increased compared to prior constructions wherein rim 116 is lacking. Thus, significant operating efficiencies and improved performance are obtained.

Alternative Embodiments

Figure 17:
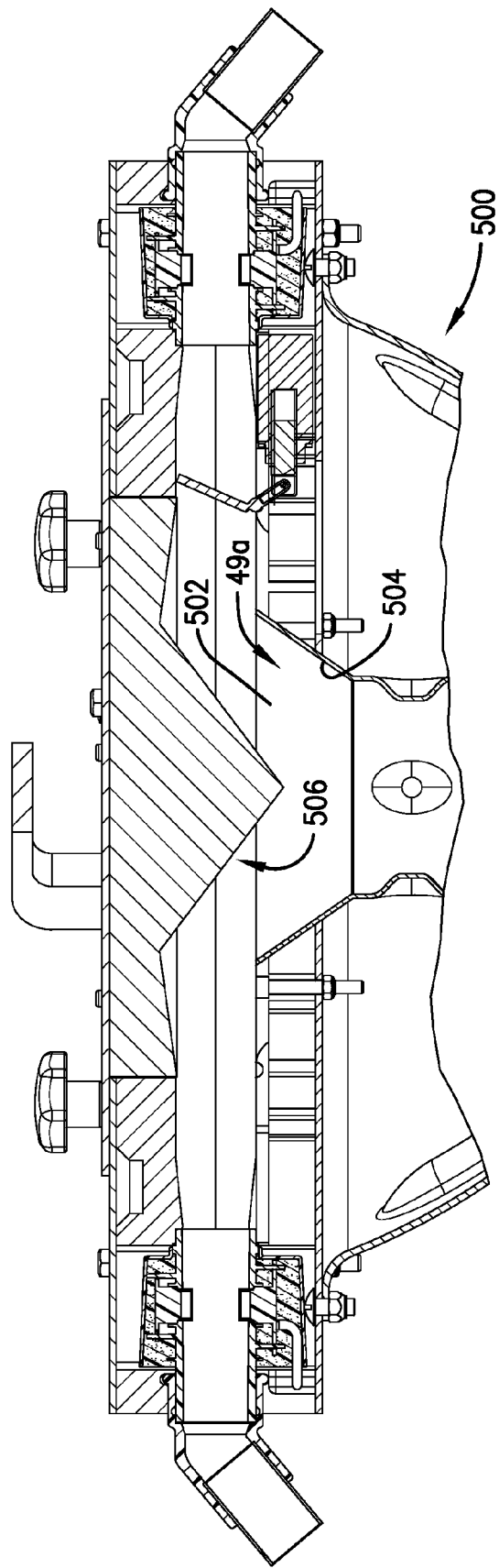

In a first alternative embodiment illustrated in FIG. 17, the tower 500 has an eased inlet 49a that comprises a beveled opening 502 into plenum 48. Beveled opening 502 has outwardly flaring sloping sidewalls 504 that are substantially flat. The periphery of transition cone 506 in this embodiment is illustrated as being straight rather than parabolic, but a parabolic construction would also be effective.

Figure 18:
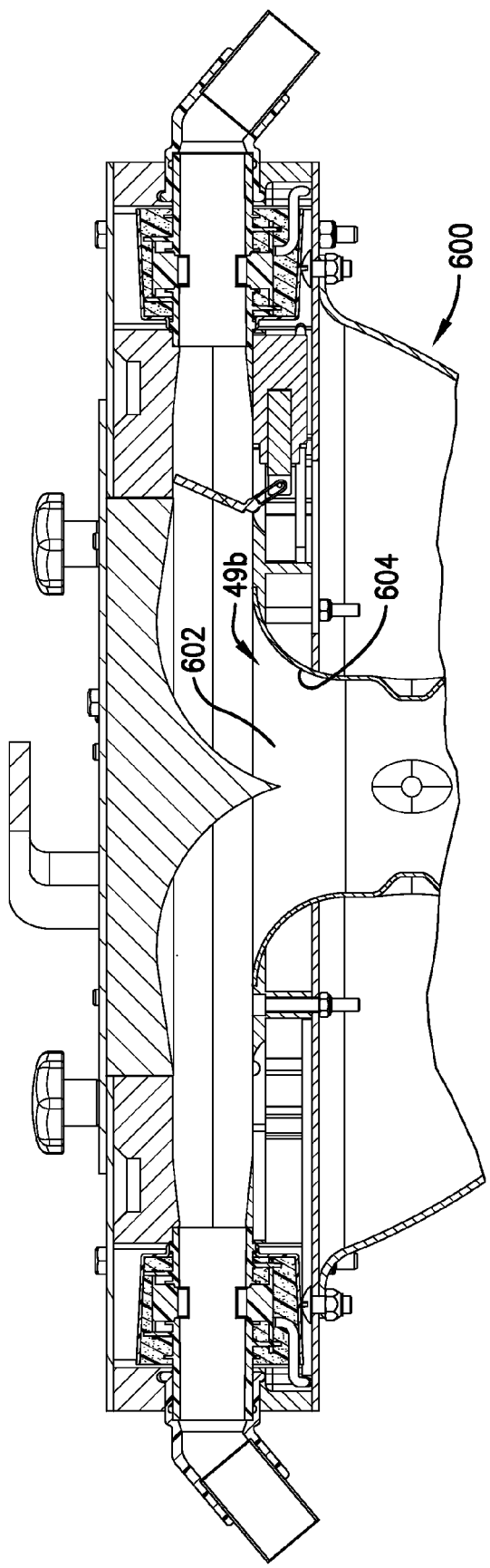

In a second alternative embodiment illustrated in FIG. 18, the tower 600 has an eased inlet 49b that comprises a beveled opening 602 of slightly different construction than beveled opening 502 of tower 500. In tower 600, the beveled opening 602 has gently convexly rounded, outwardly flaring sidewalls 604. Also, transition cone 606 in tower 600 has a parabolic, rather than straight, sidewall. Both of these alternative designs for the eased inlet can be expected to provide superior outcomes compared to the sharp-cornered prior art inlets.

The inventors hereby state their intent to rely on the Doctrine of Equivalents to determine and assess the reasonably fair scope of the present invention as it pertains to any apparatus not materially departing from but outside the literal scope of the invention as set forth in the following claims.

The invention claimed is:
1. A seed distribution tower for an air seeder comprising:
an upright conduit for conveying a combination of seeds and air in a primary stream toward an upper end of the conduit;
a distribution head at said upper end of the conduit for receiving the primary stream from the conduit and splitting the primary stream into a plurality of secondary streams that issue from a plurality of discharge outlets on the distribution head, said distribution head having an exterior and an interior;
at least one actuatable shut-off valve disposed within said interior of the distribution head for blocking the discharge of a secondary stream from at least one of said outlets when the valve is in a closed position; and
an actuator disposed within said interior of the distribution head and operably coupled with said valve for operating the valve.

2. A seed distribution tower as claimed in claim 1,
said actuator comprising an electrically operated solenoid.

3. A seed distribution tower as claimed in claim 1, further comprising at least one sensor for detecting seed flow through an outlet,
said at least one sensor being disposed within said interior of the distribution head.

4. A seed distribution tower as claimed in claim 3,
said at least one sensor being disposed within an outlet.

5. A seed distribution tower as claimed in claim 3,
said distribution head having a bottom,
further comprising electrical hardware below said bottom of the distribution head and connected with said actuator and said sensor,
further comprising a protective housing disposed below said bottom of the distribution head and enclosing said hardware.

6. A seed distribution tower as claimed in claim 5,
said hardware comprising an electrical conductor leading downwardly away from said distribution head and a connector at a distal end of the conductor.

7. A seed distribution tower as claimed in claim 1,
said at least one sensor comprising a photoelectric sensor.

8. A seed distribution tower as claimed in claim 1,
said distribution head having an internal plenum communicating with the upper end of said conduit and said outlets,
said plenum having a floor provided with a central opening aligned axially with the upper end of said conduit,
said outlets being arranged in a circular series at an outer periphery of the plenum and spaced radially outwardly from said opening,
each of said outlets having a radially inner end,
said valve being disposed at the inner end of said one outlet.

9. A seed distribution tower as claimed in claim 8,
said distribution head having a chamber spaced below said one outlet,
said actuator being disposed within said chamber and operably coupled with said valve for selectively shifting the valve to said closed position.

10. A seed distribution tower as claimed in claim 9,
said valve comprising a flap pivotal toward and away from said closed position,
said flap having an operating arm fixed thereto and projecting from the flap into said chamber,
said actuator comprising an electrically operated solenoid operably connected to said arm.

11. A seed distribution tower as claimed in claim 1,
said distribution head having an internal plenum communicating with the upper end of said conduit and said outlets,
said outlets being arranged in a circular series at an outer periphery of the plenum and spaced radially outwardly from said upper end of the conduit,
each of said outlets comprising a radially extending tubular passage,
further comprising a sensor in each of said passages for detecting seed flow through the passage.

12. A seed distribution tower as claimed in claim 11, each of said sensors comprising a photoelectric sensor.

13. A seed distribution tower for an air seeder comprising:
an upright conduit for conveying a combination of seeds and air in a primary stream toward an upper end of the conduit;
a distribution head at said upper end of the conduit for receiving the primary stream from the conduit and splitting the primary stream into a plurality of secondary streams that issue from a plurality of discharge outlets on the distribution head;
a plurality second hoses connected to respective ones of said discharge outlets for use in receiving secondary streams from said discharge outlets and conveying said secondary streams to locations remote from the tower; and
sensors disposed within said discharge outlets for detecting seed flow through said outlets.

14. A seed distribution tower as claimed in claim 13,
said distribution head having an internal plenum communicating with the upper end of said conduit and said outlets,
said outlets being arranged in a circular series at an outer periphery of the plenum and spaced radially outwardly from said upper end of the conduit,
each of said outlets comprising a radially extending tubular passage,
each sensor being located between opposite ends of said passage.

15. A seed distribution tower as claimed in claim 14,
each of said sensors comprising a photoelectric sensor.

16. A seed distribution tower for an air seeder comprising:
an upright conduit for conveying a combination of seeds and air in a primary stream toward an upper end of the conduit;
a distribution head at said upper end of the conduit for receiving the primary stream from the conduit and splitting the primary stream into a plurality of secondary streams that issue from a plurality of discharge outlets on the distribution head;
electrical hardware below said distribution head and connected with a component at said head; and
a protective housing surrounding said conduit below said head and enclosing said hardware.

17. A seed distribution tower as claimed in claim 16,
said component comprising an actuable shut-off valve for blocking the discharge of a secondary stream from at least one of said outlets when the valve is in a closed position.

18. A seed distribution tower as claimed in claim 16,
said component comprising a sensor for detecting seed flow through an outlet.

19. A seed distribution tower as claimed in claim 16,
said hardware comprising an electrical conductor leading downwardly away from said distribution head and a connector at a distal end of the conductor.

20. A seed distribution tower as claimed in claim 19,
further comprising an electrical lead that includes a first portion inside said housing and a second portion outside said housing,
said first portion of said lead being electrically coupled with said electrical conductor inside said housing via said connector,
said housing having an opening through which said lead may pass from outside said housing to inside said housing.

21. A seed distribution tower as claimed in claim 20,
said housing being generally bowl-shaped with an upper end adjacent said head and a lower end spaced below said head,
said upper end being wider than said lower end.

22. A seed distribution tower as claimed in claim 16,
said housing being generally bowl-shaped with an upper end adjacent said head and a lower end spaced below said head,
said upper end being wider than said lower end.

23. A seed distribution tower as claimed in claim 16, said housing being attached to and supported by said head.

\* \* \* \* \*